Figure 1:
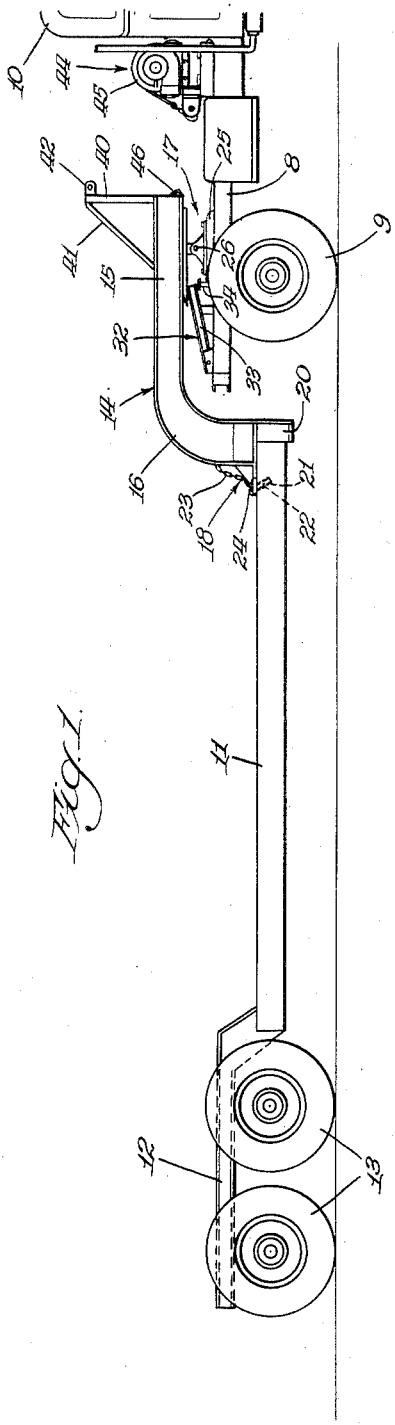

Nov. 22, 1949           A. G. TALBERT           2,489,112
COUPLING FOR TRACTOR AND SEMITRAILER
UNITS OR THE LIKE

Filed Feb. 24, 1947           2 Sheets-Sheet 1

INVENTOR.
Austin G. Talbert
BY Robert H. Miehle, Jr.
Atty.

Nov. 22, 1949  A. G. TALBERT  2,489,112
COUPLING FOR TRACTOR AND SEMITRAILER
UNITS OR THE LIKE
Filed Feb. 24, 1947  2 Sheets-Sheet 2
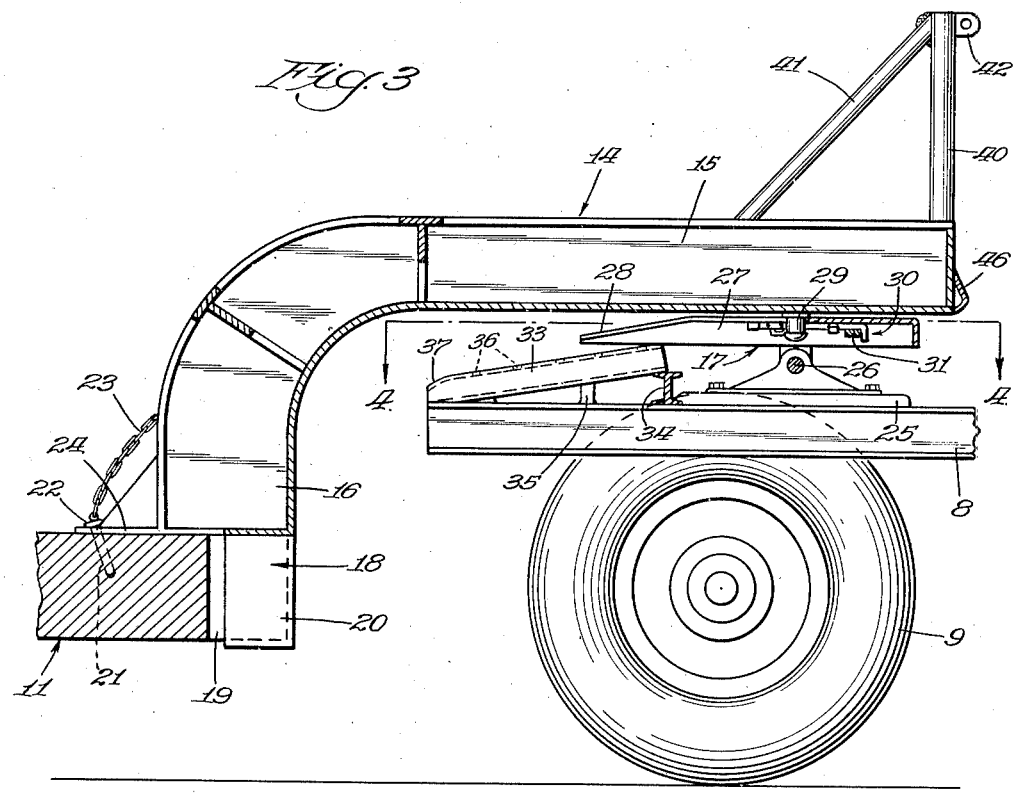
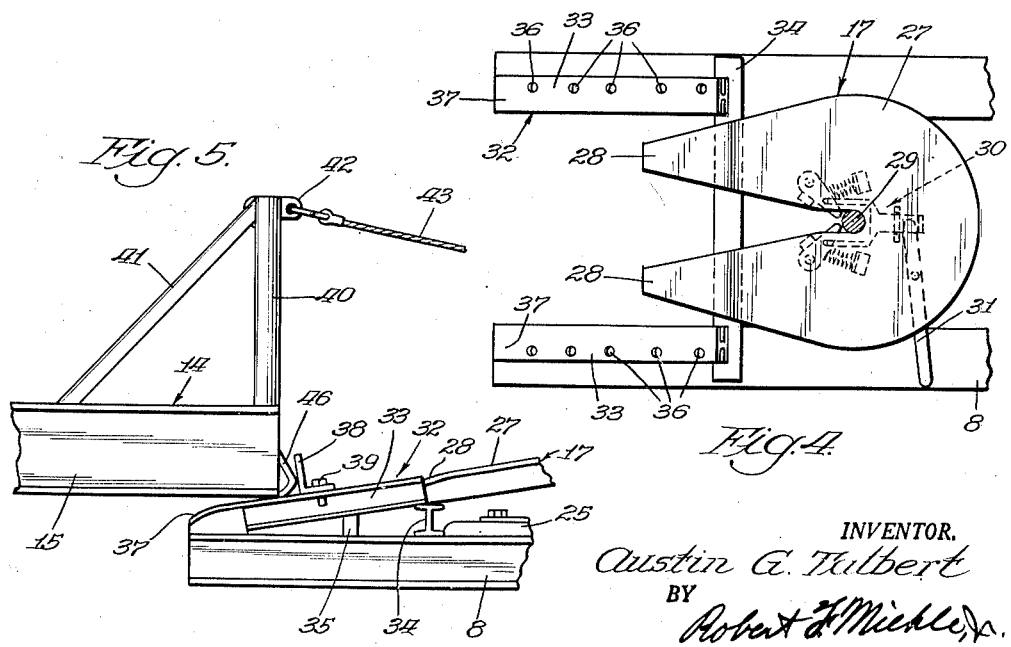
INVENTOR.
Austin G. Talbert
BY
Robert H. Miehle Jr.
Atty.

Patented Nov. 22, 1949

2,489,112

UNITED STATES PATENT OFFICE 2,489,112

COUPLING FOR TRACTOR AND SEMI-TRAILER UNITS OR THE LIKE

Austin G. Talbert, Lyons, Ill.

Application February 24, 1947, Serial No. 730,336

22 Claims. (Cl. 280—33.2)

This invention relates to a vehicle train and more particularly to a vehicle train of the tractor and semi-trailer type. More specifically, the invention relates to hitch means for connecting the semi-trailer to the tractor.

Tractor and semi-trailer units are known in which the semi-trailer consists of a low-bed vehicle supported on rear wheels and carried at its forward end by means such as an arched drawbar commonly referred to as a "gooseneck." Units of this type are adapted to transport heavy machinery and similar loads and are primarily constructed as low-bed vehicles to facilitate loading and unloading thereof. It is also known to provide the forward end of the trailer with means associated with the drawbar whereby the drawbar may be disconnected from the trailer while remaining connected to the tractor, so that the low-bed platform of the trailer is unobstructed at its forward end for loading and unloading, thus eliminating the disadvantages attendant upon loading and unloading the trailer from the sides or at the rear. The means by which the drawbar is associated with the front end of the trailer ordinarily comprises a pair of forwardly projecting elements on the trailer engageable with sockets at the lower end of the downwardly and rearwardly curving gooseneck. In the use of units so equipped, difficulty has been experienced in alining the gooseneck with the front end of the trailer for connection thereto, inasmuch as considerable differences in height exist between the trailer and gooseneck, when disconnected, due primarily to the fact that the springs of the tractor, when not subjected to the load of the forward end of the trailer, elevate the tractor frame. It therefore becomes expedient to adjust the drawbar vertically with respect to the tractor and trailer.

It is an important object of the present invention to provide improved hitch means including a drawbar of the type referred to above associated with means by which adjustment of the drawbar with respect to the trailer may be readily accomplished. It is an important object of the invention to provide adjusting means that will achieve perfect alinement of the drawbar with the connecting means on the trailer, having particular reference to the requirement that the trailer end of the drawbar must not only be alined vertically with the connecting means of the trailer but must bear such bodily relation to the trailer that the sockets on the drawbar will readily receive the projecting elements of the connecting means on the trailer.

Other objects of the invention are: to provide means by which both ends of the drawbar may be adjusted; to provide means in the form of force-exerting mechanism and a ramp or inclined plane associable with the forward end of the gooseneck whereby there are provided a series of fulcrums about any one of which the drawbar may be selectively pivoted to raise and lower the rear end thereof, thus arranging the drawbar socket means in parallelism with the connecting elements on the trailer; to associate the ramp means with a tiltable fifth-wheel so that when the fifth-wheel is tilted downwardly and rearwardly prior to connection of the drawbar therewith, the plane of the ramp is substantially coincident with the inclined plane formed by the fifth-wheel; to construct the ramp in the form of means readily attachable to conventional tractors and including in a preferred embodiment a pair of transversely spaced apart members, one positionable at either side of the fifth-wheel structure, and adapted to receive adjustably thereon a transverse member against which the forward end of the drawbar may abut; and to provide means preferably in the form of a lever arm readily attachable to the drawbar of a conventional tractor and semi-trailer unit, the general principles of the invention being directed toward the provision of means by which an ordinary tractor and trailer unit may be converted to one embodying the foregoing features and others to appear as the invention is set forth in greater detail below.

Figure 2:
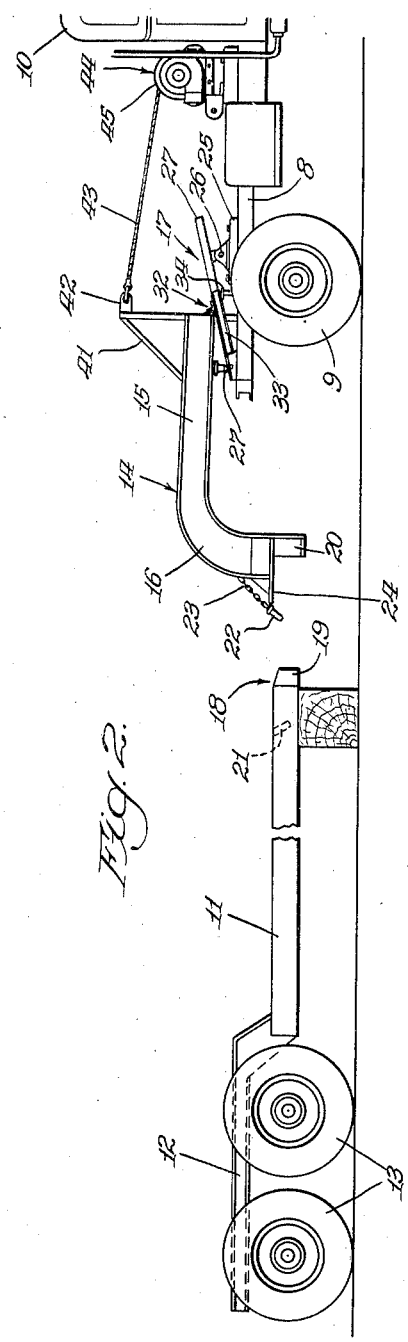

In the drawings: Fig. 1 is a side elevational view of one form of tractor and semi-trailer unit illustrating a preferred embodiment of the invention in connection therewith; Fig. 2 is a similar view with the trailer disconnected from the tractor and with the drawbar in position to be adjusted with respect to the tractor and trailer; Fig. 3 is an enlarged view of the rear portion of the tractor, front portion of the trailer, and the drawbar, certain parts being shown in section to better illustrate the relationship therebetween; Fig. 4 is a fragmentary sectional view taken on the line 4—4 of Fig. 3; and Fig. 5 is a fragmentary side elevational view on an enlarged scale illustrating the relationship between the front end of the drawbar and the ramp on the tractor.

Although the following description will proceed in connection with the illustration of a tractor and semi-trailer unit, it should be understood that the principles of the invention have wider application and may be easily adapted to vehicle trains of other types. The details of the description and illustration should therefore not be taken as delineating the scope of the invention.

For the purposes of illustration the vehicle train herein disclosed is shown as including a tractor having a longitudinal main frame 8 supported on rear traction wheels 9 and further carried by front wheels (not shown). A portion of the tractor cab is illustrated at 10. The trailer is of the low-bed type having a relatively long body or platform 11 including an upwardly arched rear portion 12 carried on rear bogie wheels 13.

The forward portion of the trailer body 11 is provided with connecting means through which connection may be made to coupling means in the form of an arched drawbar or gooseneck 14. The gooseneck includes a horizontal forwardly extending portion 15 and a downwardly extending rear portion 16, the former of which is connectible to the tractor by means of a fifth-wheel structure indicated generally by the numeral 17 and the latter of which is connectible to the trailer body 11 via the connecting means thereon as indicated generally by the numeral 18.

The connecting means 18 preferably comprises a pair of longitudinally forwardly extending tapering connecting elements 19 (only one of which is shown) adapted to be received by and fit in a pair of correspondingly transversely spaced sockets 20 rigidly attached to and depending from the rear portion 16 of the drawbar 14. Only one of the sockets 20 is shown. The connecting means 18 on the trailer further embodies a small socket 21 adapted to receive a connecting pin 22 carried by the drawbar 14. The pin 22 is preferably secured to the drawbar by means of a flexible element in the form of a chain 23, this means preventing loss of the pin. An integral or otherwise rigidly associated flange 24 projects rearwardly from the rear portion 16 of the drawbar and is apertured in such manner that it is alined with the socket 21 of the connecting means 18 on the trailer to receive the pin 22. The relationship between the connecting elements 19 on the trailer and the sockets 20 on the drawbar is such as to provide a rigid connection between the trailer and drawbar and the connecting pin prevents relative longitudinal displacement between the trailer and drawbar. Although only one such connecting pin 22 is illustrated, two or more may be provided.

The fifth-wheel structure 17 of the tractor comprises a supporting member 25 including a pivot pin 26 on a transverse horizontal axis. A fifth-wheel plate 27 is carried on this pivot pin and may consequently move from the horizontal position illustrated in Figs. 1 and 3 to the inclined position illustrated in Figs. 2 and 5. The rear portion of the fifth-wheel plate 27 is bifurcated as is conventional. The portions provided by the bifurcation are inclined as at 28 to facilitate connection of the drawbar 14 to the fifth-wheel 17. The under side of the forward portion 15 of the drawbar 14 includes a vertical pintle 29 which is received between the bifurcations of the fifth-wheel plate 27 and which, when the drawbar is connected to the fifth-wheel 17, is located at the center of the fifth-wheel plate, being held therein by releasable latch means which may be of any conventional type, as indicated at 30 in the drawings. The latch means may be controlled as by a manually actuated lever 31 which extends outwardly from the fifth-wheel plate at one side thereof. The connection 29 between the drawbar 14 and the fifth-wheel 17 provides for pivoting of the drawbar on the tractor about the vertical axis established by the connecting pin 29.

The means by which the forward end 15 of the drawbar 14 may be adjusted on the tractor includes a ramp designated generally by the numeral 32 and preferably comprises a pair of transversely spaced apart, longitudinally forwardly and upwardly extending members in the form of I-beams 33. The I-beams 33 are supported at their forward ends by a transverse member in the form of another I-beam 34 rigidly secured to the tractor frame 8 by any suitable means. The under sides of the rear ends of the I-beams are supported directly on the tractor frame and each I-beam is supported intermediate its ends by a block 35 which is rigidly secured, as by welding or otherwise, to the I-beam and to the tractor frame. The upper flange of each I-beam 33 is provided with a series of longitudinally spaced apertures 36, the purpose of which will presently appear. The inclination of the I-beams is such as to form a continuation of the inclination of the fifth-wheel plate 27 when the latter is tilted downwardly prior to connection thereto of the drawbar 14 (Fig. 5). The rear ends of the I-beams are further tapered as at 37 to further facilitate connection of the drawbar.

The means for adjusting the forward end of the drawbar 14 further includes a transverse member in the form of an angle bar 38 adapted to be secured by cap screws 39 to the upper flanges of the I-beams 33, the apertures 36 in the I-beams being tapped to receive the cap screws. The forward end 15 of the drawbar 14 includes another component of the adjusting means, preferably in the form of a lever arm 40 which extends upwardly from the forward end 15 and is welded or otherwise rigidly secured to and braced to the drawbar by a brace member 41. The upper end of the lever arm 40 includes an apertured ear 42 by means of which a flexible element in the form of a cable or rope 43 may be removably connected. The other end of the cable 43 is connected to mechanism including a winch designated generally by the numeral 44. The winch includes a drum 45 about which the cable 43 may be wound. The drum may be driven by suitable gearing connected to the power takeoff or other suitable source (not shown) of the vehicle. Such winches and the mechanism for driving the same are generally conventional and need not be set forth in detail here.

The extreme forward end of the forward portion 15 of the drawbar 14 is provided with a transverse angle bar 46 which is engageable with the transverse angle bar 38 on the ramp when the drawbar 14 is being adjusted.

It will be noted from the foregoing description that a conventional tractor and semi-trailer unit may be easily and inexpensively modified to include the structure set forth. In many cases this structure may be added to the tractor and to the drawbar merely by supplementing these components and requiring no basic structural alterations.

In the use of a tractor and trailer unit equipped with the invention as set forth above, connection of the trailer to the tractor is facilitated by use of the wide flexibility imparted to the adjustability of the drawbar. Looking now to Fig. 2 it will be seen that the trailer is disconnected from the tractor and the forward end of the former is supported by blocks so that the bed of the trailer is substantially in the height it will be when connected to and towed by the tractor. The arrangement set forth is generally that followed in connecting and disconnecting the tractor and trailer and in loading and unloading the latter. With the trailer in the position shown, the drawbar 14 is associated with the tractor and is positioned thereon by means of the ramp 32, the bar 38 and winch means 44. The desired height of the forward end 15 of the drawbar 14 is determined with reference to the height of the connecting elements 19 of the connecting means 18 at the forward end of the trailer body 11. The transverse angle bar 38 may then be selectively positioned on the I-beams 33 by means of the cap screws 39 and apertures 36. The transverse angle bar 46 at the front end of the drawbar 14 engages or abuts the vertical flange of the angle bar 38 on the ramp 32 in such a manner that there is provided a fulcrum on a transverse horizontal axis about which the drawbar 14 may be pivoted to raise or lower the rear drawbar portion 16 to position the sockets 20 on the drawbar with reference to the connecting elements 19 on the trailer, pivoting of the drawbar being accomplished by means of the winch 44 and cable 43.

In the event that the height of the connecting elements 19 on the trailer is such that the fulcruming of the drawbar 14 on the ramp 32 does not properly aline the sockets with the elements 19 the front end of the drawbar may be adjusted up and down the bearing surface provided by the upper flanges of the I-beams 33. The tranverse angle member 38 is, of course, first removed until the desired location of the fulcrum is achieved. During adjustment of the drawbar 14 up and down the ramp 32 the fifth-wheel plate 27 assumes the inclined position of Figs. 2 and 5. As a result of this relationship between the fifth-wheel plate 17 and ramp 32 the drawbar 14, after connection to the trailer body 11 and after removal of the transverse angle bar 38, may progress upwardly on the ramp 32 to the fifth-wheel plate 27 and forwardly on the latter until the pin 29 is received by the latch means 30.

Although it may superficially appear that a single fulcrum on the tractor would be sufficient to accomplish adequate adjustment of the rear drawbar portion 16 with respect to the connecting elements 19 on the trailer, it will be seen that such is not the case. The disposition of the forward end of the trailer at varying heights requires that the forward end of the drawbar 14 be similarly disposed at varying heights on the ramp 32 so that accurate positioning between the elements 19 and sockets 20 may be obtained. Otherwise the sockets 20, although vertically alined with the elements 19, may be inclined to the horizontal in such manner as to effect sufficient misalinement to prevent easy connection of the drawbar 14 to the trailer. It may thus be said that the adjusting means for the drawbar comprises force-exerting means and ramp means cooperable to adjust the drawbar 14 bodily vertically, since both ends of the drawbar are adjusted. The transverse extent of the angle bar 38 on the ramp 32 and the angle bar 46 on the drawbar 14 is such as to prevent lateral cocking of the drawbar with respect to the tractor. The disposition of the angle bar 46 on the drawbar 14 in such manner that the corner thereof engages the rear vertical flange of the angle bar 38 on the ramp 32 provides substantially line contact between these two parts, thus improving the fulcrum.

Further note should be taken of the relationship between the ramp 32 and the fifth-wheel structure 17. When the trailer is finally connected to the tractor through the drawbar 14 and fifth-wheel structure 17 the fifth-wheel plate 27 occupies the horizontal position of Figs. 1 and 3 and the under side of the drawbar 14 easily clears the ramp 32, wherefore the ramp may remain permanently in position on the tractor, it being necessary to remove only the angle bar 38.

As previously stated, it is not desired that the invention be limited by the exact structural details set forth, for numerous modifications and alterations may be made in the preferred form of the invention without departing from the spirit and scope of the invention as set forth in the appended claims.

What is claimed is:

1. For a tractor and semi-trailer unit in which the trailer includes connecting means at one end forming a part of a coupling means between the trailer and tractor: coupling means for connecting the trailer to the tractor via the aforesaid connecting means, comprising a gooseneck drawbar having a first generally horizontally extending portion, a second downwardly extending portion and connecting means disposed downwardly on the second portion and connectible to the aforesaid connecting means on the trailer; means mounted on the tractor including an upwardly and forwardly inclined ramp up and down which the first portion of the drawbar may be positioned; fulcrum means adjustable along the ramp engageable with said first drawbar portion to provide a fulcrum therefor on a generally transverse axis about which the drawbar may be pivoted to raise and lower the second drawbar portion with respect to the connecting means on the trailer; and means for pivoting the drawbar on said fulcrum.

2. For a tractor and semi-trailer unit in which the trailer includes connecting means at one end forming a part of a coupling means between the trailer and tractor: coupling means for connecting the trailer to the tractor via the aforesaid connecting means, comprising a gooseneck drawbar having a first generally horizontally extending portion, a second downwardly extending portion and connecting means disposed downwardly on the second portion and connectible to the aforesaid connecting means on the trailer; means mounted on the tractor including a ramp up and down which the first portion of the drawbar may be positioned; and fulcrum means adjustable along the ramp engageable with said first drawbar portion to provide a fulcrum therefor about which the drawbar may be pivoted to raise and lower the second drawbar portion with respect to the connecting means on the trailer.

3. For a tractor and semi-trailer unit in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; means mounted on the tractor including an upwardly and forwardly inclined ramp up and down which the first portion of the drawbar may be positioned; fulcrum means adjustable along the ramp engageable with said first drawbar portion to provide a fulcrum therefor on a generally transverse axis about which the drawbar may be pivoted to raise and lower the second drawbar portion with respect to the connecting means on the trailer; and means for pivoting the drawbar on said fulcrum.

4. For a tractor and semi-trailer unit in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; and means mounted on the tractor including a stationary fulcrum element engageable with the first drawbar portion and adjustable vertically with respect to the tractor to provide a plurality of fulcrums on generally transverse axes about any one of which the drawbar may be pivoted to raise and lower the second drawbar portion with respect to the aforesaid connecting means on the trailer.

5. For a tractor and semi-trailer unit in which the tractor includes a fifth-wheel structure including a plate pivoted on a transverse axis and inclinable downwardly and rearwardly prior to connection of the tractor and trailer and in which the trailer includes connecting means at one end forming a part of a coupling means between the trailer and tractor: coupling means for connecting the trailer to the tractor via the aforesaid connecting means, comprising a gooseneck drawbar having a first generally horizontally extending portion, a second downwardly extending portion and connecting means disposed downwardly on the second portion and connectible to the aforesaid connecting means on the trailer; means mounted on the tractor including a ramp extending rearwardly from said fifth wheel plate, the plane of inclination of the ramp being generally coincident with the plane of the fifth-wheel plate when the latter is inclined downwardly and rearwardly as aforesaid, and up and down which ramp the first portion of the drawbar may be positioned; and fulcrum means adjustable along the ramp engageable with said first drawbar portion to provide a fulcrum therefor on a generally transverse axis about which the drawbar may be pivoted to raise and lower the second drawbar portion with respect to the connecting means on the trailer.

6. The invention set forth in claim 5, in which: the ramp includes a pair of transversely spaced generally longitudinal members, one at each side of the fifth-wheel structure; and the adjustable means includes a transverse member longitudinally adjustable on the longitudinal members.

7. The invention set forth in claim 6, in which: the longitudinal members are each provided with a series of longitudinally spaced apertures; and means engageable with the transverse member and with selected of said apertures for adjustably securing the transverse member to the longitudinal members.

8. For a vehicle train including first and second vehicles in which each vehicle includes at one end thereof connecting means forming terminal parts of a coupling means between said vehicles: coupling means for connecting the vehicles via the aforesaid connecting means, comprising a coupling member having first and second portions, the second portion including means connectible to the connecting means on the second vehicle; and means mounted on the first vehicle including a stationary fulcrum element engageable with the first portion of the coupling member and adjustable vertically to provide a plurality of fulcrums on axes generally transverse to the vehicles about any one of which axes the coupling member may be pivoted to raise and lower the second portion thereof with respect to the aforesaid connecting means on the second vehicle.

9. For a vehicle train including first and second vehicles in which each vehicle includes at one end thereof connecting means forming terminal parts of a coupling means between said vehicles: coupling means for connecting the vehicles via the aforesaid connecting means, comprising a coupling member having first and second portions, the first portion including means connectible to the connecting means on the first vehicle and the second portion including means connectible to the connecting means on the second vehicle; and means mounted on the first vehicle including a stationary fulcrum element engageable with the first portion of the coupling member and adjustable vertically to provide an adjustable fulcrum about which the coupling member may be pivoted to raise and lower the second portion thereof with respect to the aforesaid connecting means on the second vehicle.

10. For a tractor and semi-trailer unit in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; and means mounted on the tractor including a stationary fulcrum element engageable with the first drawbar portion and adjustable vertically with respect to the tractor to provide an adjustable fulcrum about which the drawbar may be pivoted to raise and lower the second drawbar portion with respect to the aforesaid connecting means on the trailer.

11. For a tractor and semi-trailer unit in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; and mechanism mounted on the tractor including winch means and a ramp associable with the first drawbar portion to adjust the drawbar for positioning the second drawbar portion with respect to the connecting means on the trailer, said ramp providing a plurality of supporting points for the drawbar, and said winch means being adapted to hold the drawbar against rearward tilting movement when supported on the ramp in any desired position.

12. For a tractor and semi-trailer unit in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; and mechanism mounted on the tractor including winch means and a ramp associable with the drawbar for adjusting the drawbar bodily with respect to the tractor and trailer, said ramp providing a plurality of supporting points for the drawbar, and said winch means being adapted to hold the drawbar against rearward tilting movement when supported on the ramp in any desired position.

13. For a vehicle train including first and second vehicles in which each vehicle includes at one end thereof connecting means forming terminal parts of a coupling means between the vehicles: coupling means for connecting the vehicles via the aforesaid connecting means, comprising a coupling member having first and second portions, the first portion including means connectible to the connecting means on the first vehicle and the second portion including means connectible to the connecting means on the second vehicle; and mechanism mounted on the first vehicle including winch means and a ramp associable with the first coupling member portion to adjust the coupling member for positioning the second coupling member portion with respect to the connecting means on the second vehicle, said ramp providing a plurality of supporting points for the drawbar, and said winch means being adapted to hold the drawbar against rearward tilting movement when supported on the ramp in any desired position.

14. For a tractor and semi-trailer unit in which the tractor includes a fifth-wheel structure including a plate pivoted on a transverse axis and inclinable downwardly and rearwardly prior to connection of the tractor and trailer and in which the trailer includes connecting means at one end forming a part of a coupling means between the trailer and tractor: coupling means for connecting the trailer to the tractor via the aforesaid connecting means, comprising a drawbar having a first portion, a second portion and connecting means on the second portion and connectible to the aforesaid connecting means on the trailer; means mounted on the tractor including a ramp extending rearwardly from the fifth wheel plate, the plane of inclination of the ramp being generally coincident with the plane of the fifth-wheel plate when the latter is inclined downwardly and rearwardly as aforesaid, and up and down which ramp the first portion of the drawbar may be positioned; fulcrum means adjustable along the ramp engageable with said first drawbar portion to provide a fulcrum therefor on a generally transverse axis about which the drawbar may be pivoted to raise and lower the second drawbar portion with respect to the connecting means on the trailer and means for pivoting the draw bar comprising a lever arm fixed on the first portion of the drawbar and extending upwardly therefrom, a winch mounted on the tractor forwardly of the fifth wheel structure and a cable connecting the drum of the winch with an upper portion of said lever arm.

15. A removable gooseneck for detachably connecting a tractor with a low-bed heavy duty trailer, comprising a rigid coupling member characterized by a forwardly extending portion adapted for pivotal connection with the tractor and a downwardly extending portion at the rear end of the forwardly extending portion adapted for rigid connection with the trailer, said coupling member being provided adjacent the front end of its forwardly extending portion with transversely disposed fulcruming means for coaction with an abutment on the tractor to permit support of said member on said abutment through said fulcruming means, and said coupling member being also provided adjacent the front end of its forwardly extending portion with coupling means adapted to be connected with power means on the tractor to support the coupling member from the tractor through said fulcrum means.

16. A removable gooseneck for detachably connecting a tractor with a low-bed heavy duty trailer, comprising a rigid coupling member characterized by a forwardly extending portion adapted for pivotal connection with the tractor and a downwardly extending portion at the rear end of the forwardly extending portion adapted for rigid connection with the trailer, said coupling member being provided at the lower end of its downwardly extending portion with two laterally spaced rearwardly opening sockets, which sockets are adapted to receive forwardly projecting lugs on the front end of the trailer, and being provided immediately above said sockets with two rearwardly projecting ledges, which ledges are adapted to bear downwardly against the front end of the trailer at points rearwardly of the lugs, and means associated with the ledges adapted to detachably lock the latter to the trailer against endwise movement.

17. A hitching device of the character described for use in detachably connecting a trailer to a tractor, comprising a rigid coupling member having a forwardly extending portion which is adapted when in operative position to be pivotally connected with a tractor and a downwardly extending portion which is adapted when in operative position to be fixedly connected with a trailer, said forwardly extending portion being provided on the underside of its front end with a transverse shoulder for coaction with an abutment on the tractor to permit fulcruming of the member about said shoulder in a vertical plane, and being provided above its front end with elevated cable attaching means for coaction with a cable winch on the tractor to permit support of the member from the tractor independently of the trailer through said fulcruming shoulder during removal from or connection with the trailer.

18. In a tractor of the type provided with a fifth-wheel plate on which the drawbar of a trailer is adapted to be pivotally mounted, an inclined ramp behind the plate up which the drawbar is adapted to be slid onto the plate, and a cable winch in front of the plate by means of which the drawbar is adapted to be slid up the ramp onto the plate; the provision of a stop associated with the ramp, which stop is adapted to provide a fulcrum about which the drawbar will pivot in a vertical plane when connected to and elevated by the cable winch, and means for adjustably positioning said stop longitudinally of the ramp, whereby to vary the elevation of the fulcruming point.

19. In a trailer of the type having an underslung bed and supporting wheels at the rear end only of the bed, two laterally spaced lugs projecting forwardly from the front end of the bed in substantially the plane of the latter, a removable gooseneck at the front end of the bed adapted for pivotal connection with a trailer, said gooseneck being provided with a forwardly extending portion adapted to overlie the rear end of the tractor and a downwardly extending portion at the rear end of the forwardly extending portion, which downwardly extending portion is provided adjacent its lower end with two laterally spaced rearwardly opening sockets for the reception of said lugs and two rearwardly extending ledges above said sockets for abutment with the upper surface of the bed at points rearwardly of said lugs, and means for detachably locking the gooseneck to the bed to prevent endwise relative movement therebetween.

20. In a trailer of the type having an underslung bed and supporting wheels at the rear end only of the bed, two laterally spaced lugs projecting forwardly from the front end of the bed in substantially the plane of the latter, a removable gooseneck at the front end of the bed adapted for pivotal connection with a trailer, said gooseneck being provided with a forwardly extending portion adapted to overlie the rear end of the tractor and a downwardly extending portion at the rear end of the forwardly extending portion, which downwardly extending portion is provided adjacent its lower end with two laterally spaced rearwardly opening sockets for the reception of said lugs and two rearwardly extending ledges above said sockets for abutment with the upper surface of the bed at points rearwardly of said lugs, and means for detachably locking the gooseneck to the bed to prevent endwise relative movement therebetween, said locking means consisting of pins which are adapted to be passed downwardly through apertures in the ledges into registering apertures in the bed.

21. The combination with a low bed trailer, the rear end of which is supported on wheels and the front end of which is adapted to be supported on a tractor, of a removable gooseneck adapted to be rigidly connected with the front end of the trailer, said gooseneck and trailer being provided with complementary interfitting formations which are adapted to be brought together telescopically in a generally horizontal direction longitudinally of the trailer to effect said rigid connection, said gooseneck being provided with releasable means cooperable with an element on a tractor for pivoting the gooseneck on the tractor for movement in a generally horizontal plane, and said gooseneck being also provided with other means operable upon release of said pivoting means and cooperable with other elements on the tractor for supporting the gooseneck stably on the tractor in a bodily lowered position, whereby to permit coupling or uncoupling of the gooseneck to or from the trailer with the front end of the trailer lowered for loading or unloading, said last mentioned means including a transversely extending generally horizontal fulcruming formation on the gooseneck adjacent the front end of the latter, which formation is adapted to bear against a support on the tractor, and an upwardly extending lever arm on the gooseneck adjacent the front end of the latter, which arm is adapted to be connected at its upper end with power transmitting means on the tractor.

22. The combination with a tractor, and a longitudinally elongated low bed trailer having supporting wheels at its rear end only, which trailer is adapted to be loaded and unloaded over its front end after such end has been lowered onto independent supporting means and the tractor driven out of the way, of a removable gooseneck, which gooseneck is pivotally connected with the tractor for horizontal swinging movement relative to the tractor and is rigidly but releasably connected with the trailer for movement as a unit with the same, and means on the tractor for bodily lowering the gooseneck relative to the tractor while the gooseneck is still rigidly connected with the front end of the trailer, said means also serving to support the gooseneck on the tractor and hold the gooseneck stationary against horizontal swinging movement relative to the tractor in its lowered position after it has been disconnected from the trailer, said means including an inclined ramp on the tractor down which the gooseneck is adapted to slide, an adjustably positioned stop on the ramp against which the gooseneck is adapted to be held, and power means on the tractor connectible with the gooseneck for holding the latter against the stop on the ramp.

AUSTIN G. TALBERT.

REFERENCES CITED

The following references are of record in the file of this patent:

UNITED STATES PATENTS

| Number | Name | Date |
|---|---|---|
| 2,144,243 | Fraser et al. | Jan. 17, 1939 |
| 2,223,650 | Weber | Dec. 3, 1940 |
| 2,312,769 | Mosling | Mar. 2, 1943 |
| 2,325,869 | Mosling | Aug. 3, 1943 |
| 2,331,713 | Mosling | Oct. 12, 1943 |
| 2,350,841 | Troche et al. | June 6, 1944 |
| 2,389,211 | Pointer | Nov. 20, 1945 |